Figure 1:
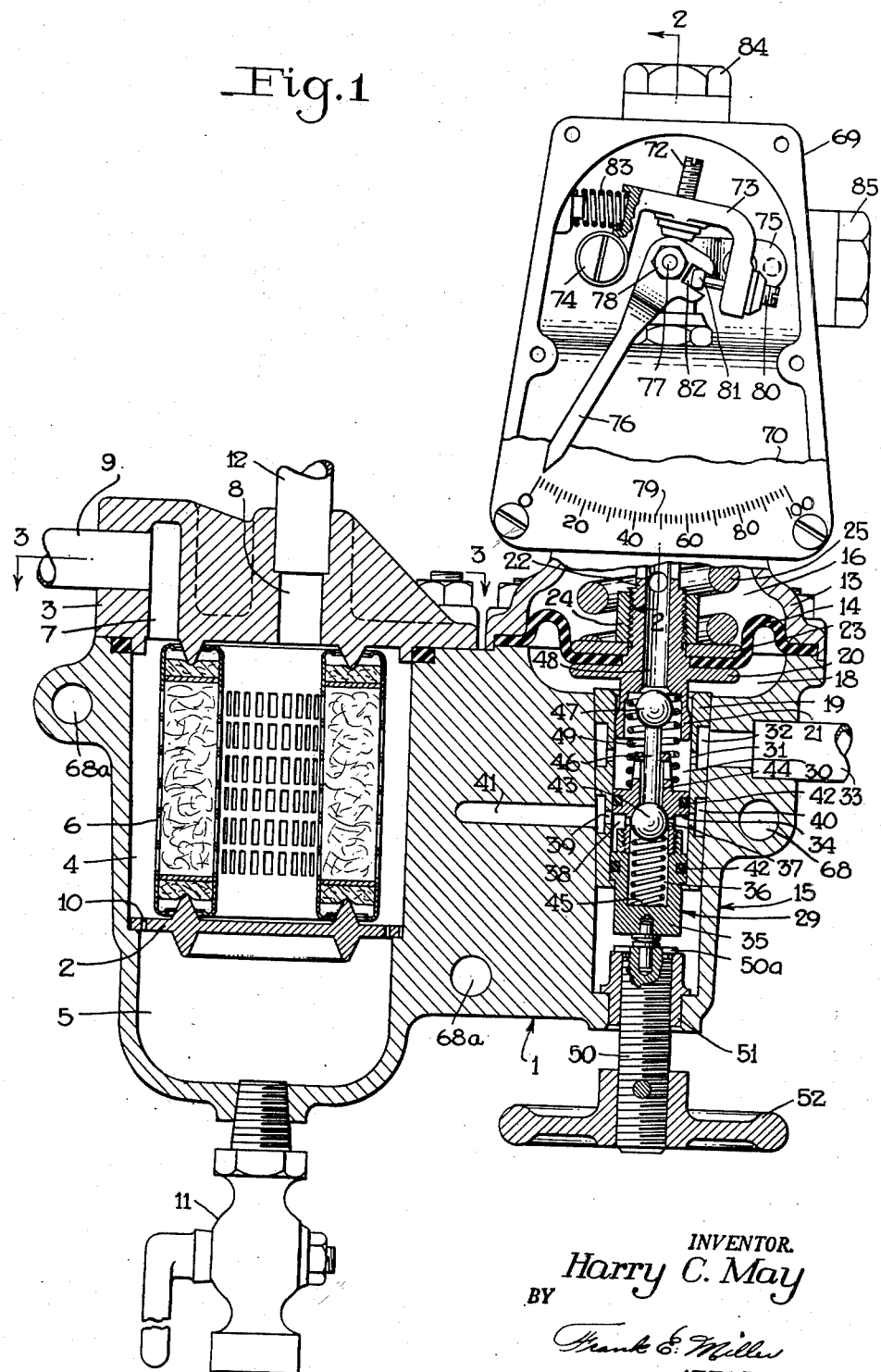

April 26, 1955

H. C. MAY 2,706,995

COMBINED FLUID PRESSURE CONTROL VALVE DEVICE AND GAUGE

Filed Nov. 9, 1949

2 Sheets-Sheet 1

INVENTOR.
Harry C. May
BY
Frank E. Miller
ATTORNEY

April 26, 1955

H. C. MAY 2,706,995

COMBINED FLUID PRESSURE CONTROL VALVE DEVICE AND GAUGE

Filed Nov. 9, 1949

2 Sheets-Sheet 2

INVENTOR.
Harry C. May
BY
Frank E. Miller
ATTORNEY

United States Patent Office 2,706,995
Patented Apr. 26, 1955

2,706,995
COMBINED FLUID PRESSURE CONTROL VALVE DEVICE AND GAUGE

Harry C. May, East McKeesport, Pa., assignor to Westinghouse Air Brake Company, a corporation of Pennsylvania Application November 9, 1949, Serial No. 126,412

2 Claims. (Cl. 137—116.5)

This invention relates to fluid pressure control valve device and more particularly to means for supplying fluid at a chosen regulated pressure to a device to be operated.

In shops fluid under pressure is often used for controlling through the medium of a fluid pressure actuated piston or the like the operation of a clutch or other tool. The fluid under pressure for such control is usually derived from a shop line at relatively high pressure and is lead to the tool operating piston through an operator's cut-off valve device, a pressure reducing valve device for reducing the line pressure down to that which it is desired to employ for operating said piston and a strainer device for removing foreign matter from the fluid under pressure to avoid fouling said devices and piston. The different devices are usually connected together by pipes, and a volume reservoir is connected to the pipe leading from the outlet side of the reducing valve device, a drain cock is connected to said reservoir for releasing accumulated moisture therein, and a pressure gauge of the Bourdon type is arranged to indicate the pressure acting on the piston. The volume reservoir is for delaying increase in pressure on the piston, when the operator's cut-off valve device is opened and hence rapidly supplies fluid under pressure to the reducing valve device, to such an extent as to permit said reducing valve device to operate to cut off supply of fluid under pressure to said piston before the pressure therein is increased to a degree in excess of that desired. If the reservoir were not employed the pressure on the piston would build up to a degree in excess of that desired before the reducing valve device could operate to limit such pressure. Moreover the pressure gauge is dependable for only a very short period of time.

From the above it will be seen that the several devices, pipes and reservoir constitute an awkward, unwieldy and make shift arrangement and requires considerable time and labor to initially install and subsequently maintain.

The principal object of the invention is therefore the provision of a single, relatively simple and compact device, embodying a pressure indicating means which will be dependable indefinitely, for use in place of and to accomplish the same result as the several devices, pipes, reservoir and pressure gauge above described.

Other objects and advantages will become apparent from the following more detailed description of the invention.

Figure 2:
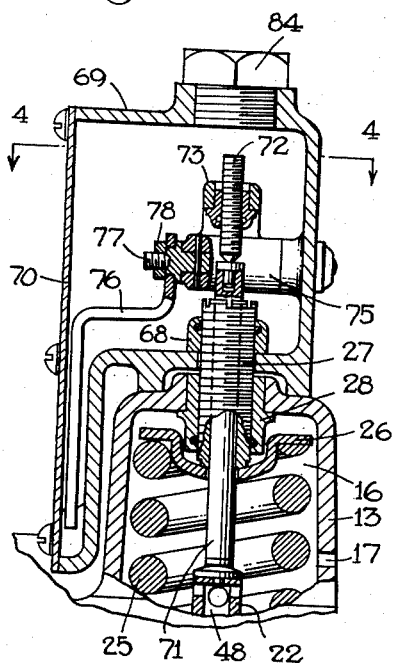
Figure 3:
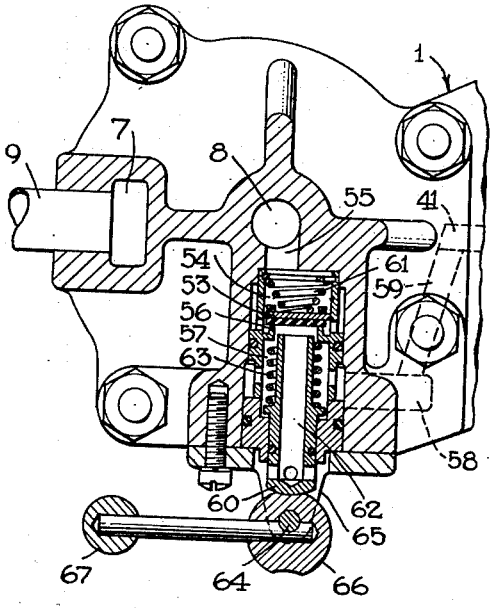
Figure 4:
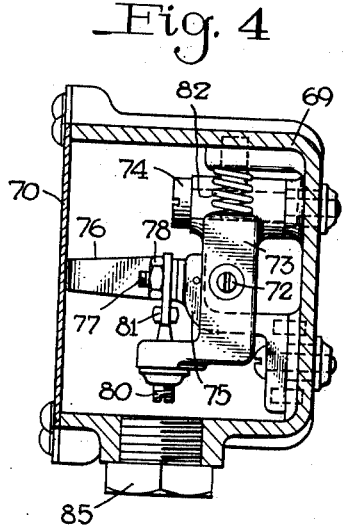

In the accompanying drawings; Fig. 1 is a vertical view, mainly in section, of a fluid pressure control and pressure indicating device embodying the invention; Figs. 2 and 3 are sectional views taken on lines 2—2 and 3—3 in Fig. 1; and Fig. 4 is a sectional view taken on the line 4—4 in Fig. 2.

Description

As shown in the drawing, the improved device comprises a main casing section 1 in one side of which is a cup-shaped cavity containing a supporting plate 2 and the upper end of which is closed by a cover 3. The plate 2 divides the cavity into an upper chamber 4 and a lower chamber 5. An annular air strainer 6 disposed in chamber 4 and clamped between plate 2 and cover 3 separates a space encircling said strainer and which is open to a passage 7 in the cover 3 from a space within said strainer which is open to a passage 8 in said cover. The passage 7 is adapted to be connected to a fluid pressure supply pipe 9 which may constitute a high pressure shop line and upon flow of fluid therefrom through strainer 6 to passage 8 in the cover 3, said strainer will remove foreign matter from the air stream. Condensate in the shop line entering chamber 4 will settle into chamber 5 as by way of perforations 10 in plate 2. A drain cock 11 connected to the bottom of chamber 5 is provided for draining condensate therefrom. By removal of cover 3 the strainer 6 can be removed for cleaning or replacement. A pipe or hose 12 may be connected to passage 8 in cover 3 for conveying cleaned fluid at shop line pressure to a blow gun or the like (not shown).

At one side of cover 3 a cover 13 is secured to casing section 1 and clamped between the cover 13 and said casing section is a flexible diaphragm 14 of a self-lapping fluid pressure regulating device 15. At one side of diaphragm 14 is a chamber 16 which is open to atmosphere as by way of a passage 17 in cover 13 while at the opposite side is a control chamber 18.

The casing section 1 has a bore arranged in coaxial relation to diaphragm 14 and lined with a bushing 19, one end of which is disposed in chamber 18. A diaphragm follower 20 disposed in chamber 18 in contact with one side of diaphragm 14 has projecting from one side a sleeve-like extension 21 slidably mounted in the adjacent end portion of bushing 19. A stud-like extension 22 projects from the opposite face of follower 20 through central openings in diaphragm 14 and a follower 23 contained in chamber 16 and a nut 24 having screw-threaded engagement with said extension contacts follower 23 for clamping the central portion of said diaphragm to said followers whereby said followers will move with said diaphragm. A pressure regulating spring 25 contained in chamber 16 bears at one end against the follower 23 while its opposite end is engaged by a follower 26 in turn engaged by an adjusting screw 27 having screw-threaded engagement with an element 28 secured in cover 13.

A plunger 29 is slidably mounted in bushing 19 below the end of the diaphragm follower sleeve-like extension 21, and between said plunger and extension there is formed a fluid pressure delivery chamber 30 which is open via ports 31 in bushing 19 and an annular cavity 32 encircling said bushing to a pipe 33 through which fluid under pressure is adapted to be supplied to and released from a device such as a piston (not shown), the operation of which it is desired to control. Chamber 18 is in constant communication with chamber 30 via slight clearance space (not apparent in the drawing) between the follower extension 21 and the wall of bushing 19.

The plunger 29 comprises two parts 34 and 35 secured to each other for sliding movement in the bushing 19 and which parts cooperate to form a chamber 36 which is open through one or more ports 37 in the plunger to an annular cavity 38 formed in the peripheral surface of said plunger. The cavity 38 in turn is open through one or more ports 39 in bushing 19 to an annular cavity 40 encircling the bushing and open to a passage 41 in the casing portion. Ring seals 42 carried by the parts 34, 35 and having sealing and sliding contact with the wall of bushing 19 are so arranged as to prevent leakage of fluid under pressure past the peripheral surface of said parts from the cavity 38.

A fluid pressure supply valve 43 contained in chamber 36 is arranged to cooperate with a seat provided on the plunger part 34 to close communication between said chamber and chamber 30 by way of an axial bore 44 extending through said part. A light bias spring 45 in chamber 36 acts on valve 43 for urging it into contact with its seat. A relatively small pin 46 extending through the bore 44 has one end connected to the supply valve 43 while its opposite end is connected to a fluid pressure release valve 47 contained in chamber 30. The release valve 47 is arranged to cooperate with a seat provided on the diaphragm follower extension 21 to control communication between chamber 30 and atmosphere via an axial passageway 48 extending through said extension and the extension 22 and opening to chamber 16. A bias spring 49 in chamber 30 supported at one end on plunger 29 acts against the follower extension 21 for urging same in the direction to open communication past the release valve 47.

The lower end of plunger 29 is supported on one end of a screw 50 having screw-threaded engagement with an element 51 secured in the casing portion 1, said screw having at its inner end a collar 50a adapted to engage said element to limit outward movement of said screw. A hand wheel 52 is connected to the opposite end of screw 50 outside of the casing.

In the cover 3 there is provided a cut-off valve device comprising a supply valve 53 contained in a chamber 54. Chamber 54 is open through a passage 55 to passage 8 and thence to the interior of the strainer 6 and the valve 53 is arranged to cooperate with a seat 56 to close communication between said chamber and a chamber 57 which is open through passages 58 and 59 to passage 41 and thereby to chamber 36 in the fluid pressure regulating device 15. Slidably mounted in the cover 3 and extending into chamber 57 is a plunger 60 arranged upon inward movement to contact the supply valve 53 for moving it from seat 56. A bias spring 61 acts on the supply valve 53 for urging it into contact with its seat. The plunger 60 has an axial bore 62 open outside of the cover to atmosphere and open through the end of said plunger in chamber 57 to said chamber when said plunger is out of contact with said valve. Engagement of plunger 60 with valve 53 is adapted to close communication between chamber 57 and atmosphere via the axial bore 62. A spring 63 in chamber 57 acts on plunger 60 to move it out of engagement with valve 53.

A pin 64 carried by lugs 65 projecting from cover 3 carries a cam 66 disposed for engagement with the exposed end of plunger 60. A handle 67 is connected to the cam for turning it from an off position, in which it is shown in the drawing, through an angle of 180° to an on position. In the off position of handle 67 and cam 66 the spring 63 is adapted to unseat plunger 60 from the supply valve 53 and permit seating of said valve by spring 61. In the on position the plunger 60 is adapted to engage and unseat the supply valve 53.

Holes 68a in the casing section 1 are provided for reception of bolts or studs for mounting the device in a suitable wall or bracket.

Mounted over the adjusting screw 27 and against the cover 13 and secured in position by a nut 68 on said screw is a housing 69 of a pressure gauge, one side of which housing may be formed by a transparent element or dial 70. Slidably mounted in an axial bore through the screw 27 is a push rod 71 the lower end of which is arranged for contact in chamber 16 with the end of the follower stud like extension 22 while the upper end is disposed within the housing 69 for engagement by an adjusting screw 72 carried intermediate the ends of a lever 73 which at one end is fulcrumed on a pin 74 secured to said housing. A bracket 75 secured to the back of the gauge housing extends around to the front of the push rod 71 where one end of a gauge hand 76 is journaled on a pin 77 secured to said bracket, a nut 78 on said pin holding said hand thereon. The other end of the gauge hand is pointed and adapted to move across a scale 79 which may be provided on the transparent element 70 and which is preferably graduated in pounds.

The free end of lever 73 is offset to carry an adjustable screw 80 axially aligned with an edge of the hand 76, and having a ball-like end 81 disposed in engagement with opposite side walls of a slot 82 provided in the edge of said hand at one side of its bearing pin 77. With the hand 76 in a vertical position an extension of the axis of screw 80 is adapted to intersect the axis of pin 77. A bias spring 83 interposed between the housing 69 and lever 73 is constantly effective to urge pin 72 against the push rod 71 and to hold said rod against the follower stud-like extension 22 and at the same time through the medium of screw 80 correspondingly position the gauge hand 76 with respect to the scale 79.

Removable screw-threaded plugs 84, 85 provide access through housing 69 to screws 72, 80, respectively, for adjusting same.

After the parts of the improved device are assembled in the manner above described it is necessary first to adjust the parts of the fluid pressure regulating device 15 to compensate for variations in manufacture of said parts and to properly position the seat for the release valve 47 relative thereto. This is accomplished by first backing screw 50 out of the casing section 1 until the collar 50a thereon engages the element 51, the plunger 29 being maintained in engagement with said screw by spring 49, and the valves 43 and 47 moving with said plunger with the valve 43 seated by spring 45. The adjusting screw 27 is then operated to displace, through the medium of the fully extended regulating spring 25, the diaphragm 14 and followers 20 and 23 in the direction of the release valve 47 until the follower 20 is just on the verge of engaging said release valve.

After the adjustments just described have been effected it is necessary to adjust the gauge hand 76 to accurately indicate pressure present in pipe 33 and diaphragm chamber 18. To effect this latter adjustment the pipe 33 is connected to an accurately calibrated master gauge (not shown). Via pipe 9 the device is then connected to a source of fluid at relatively high pressure, such as usually provided in a shop line, and the opening in cover 3 to which pipe 12 is shown connected is plugged.

Handle 67 of the cut-off valve device is then turned to its on position for seating plunger 60 against valve 53 and for opening said valve whereupon fluid under pressure from pipe 9 will flow through the strainer device in chamber 4 to passage 8 and thence past said valve to chamber 57 in the cut-off valve device and from said chamber 57 through passages 58, 59 and 41 to chamber 36 in plunger 29 of the fluid pressure regulating device 15, the valve 43 in chamber 36 being closed at this time to prevent further flow of fluid under pressure.

The screw 50 will now be turned into the casing section 1 by hand wheel 52, the plunger 29 and, due to action of spring 45, the supply and release valves 43 and 47, respectively, moving with said plunger relative to diaphragm 14 and the seat on follower 20 for said release valve. Finally the release valve 47 will engage its seat on follower 20 and since the pressure of regulating spring 25 is greater than that of bias spring 45 acting on the supply valve 43, movement of both of said valves will temporarily cease as movement of the plunger 29 is continued by hand wheel 52. Therefore upon further inward movement of plunger 29 by hand wheel 52 said plunger will be moved out of seating engagement with the supply valve 43 whereupon fluid under pressure from the supply pipe 9 present in chamber 36 will flow past said valve to delivery chamber 30 and thence to pipe 33 leading to the master gauge which will operate to indicate the pressure present in chamber 30.

When fluid under pressure is thus supplied to chamber 30 and pipe 33 it will also equalize past the diaphragm follower extension 21 into chamber 18 wherein it will act on diaphragm 14 to deflect said diaphragm against the opposing force of the regulating spring 25 in accordance with the pressure of such fluid, it being noted that under action of bias spring 45 the release valve 47 will remain seated during such deflection and that said valve and the supply valve 43 will move with said diaphragm. If inward movement of the regulating screw 50 and thereby of plunger 29 is stopped fluid under pressure will continue to be supplied past the open supply valve 43 until the diaphragm 14 deflects sufficiently to permit seating of said valve to terminate such supply whereupon deflection of the diaphragm 14 will cease with both said valve and the release valve 47 closed and in a position corresponding to the pressure of fluid present in delivery chamber 30, pipe 33 and diaphragm chamber 18.

For effecting an initial adjustment of hand 76 of the pressure gauge it is desirable to provide in pipe 33 and hence diaphragm chamber 18 fluid at a "mean" of the pressure range of the gauge, that is, if the gauge is intended to register pressures between zero and 100 pounds the "mean" desired in pipe 33 and diaphragm chamber 18 will be 50 pounds.

If, due to operation of the hand wheel 52 and screw 50 the pressure in pipe 33 and diaphragm chamber 18, as indicated by the master gauge (not shown) connected to pipe 33, is less than 50 pounds, said screw will then be turned further into the casing section 1 until the pressure in said pipe and chamber is increased to 50 pounds, the diaphragm 14 and associated followers as well as rod 71 assuming a position corresponding to such pressure in the same manner as above described. If the screw 50 should be turned into the casing section 1 by hand wheel 52 so far as to provide a pressure in pipe 33 and chamber 18 in excess of 50 pounds then said screw will be backed out of the casing slightly. The plunger 29 will follow the screw 51 as it is backed out of the casing section, due to pressure of fluid and of spring 49 in chamber 30 acting on said plunger, and said plunger will move the seated supply valve 43 which will pull the release valve 47 from its seat. Fluid under pressure will then be released from pipe 33 and chamber 18 and in accordance with such reduction in pressure the regulating spring 25 will deflect the diaphragm 14 toward the release valve 47 and eventually seat said valve to prevent further release of fluid under pressure from pipe 33 and diaphragm chamber 18 for thereby limiting the pressure in said pipe and chamber to a degree corresponding to the adjusted position of screw 50.

It will thus be seen that by suitable adjustment of screw 50 fluid at the "mean" pressure above mentioned may be obtained in pipe 33 and diaphragm chamber 18 to correspondingly position the diaphragm 14, associated followers and push rod 71.

After fluid at the desired "mean" pressure, as indicated by the master gauge, is thus obtained in pipe 33 and chamber 18, the adjusting screw 72 in lever 73 is turned to bring the gauge hand 76 into registry with the 50 pound graduation on the transparent element or dial 70. With the hand 76 thus positioned the axis of screw 80 will intersect that of the pin 77.

After screw 72 is adjusted as just mentioned, the pressure of fluid in pipe 33 and diaphragm chamber 18 will be either increased or decreased to any desired pressure either side of the "mean" pressure. For example, it may be increased to 80 pounds as indicated by the master gauge connected to pipe 33 and then by adjustment of screw 80 the gauge hand 76 will be brought into registry with the 80 pound graduation on the scale 79.

In the commercial manufacture of springs, such as the regulating spring 25, no two springs will be exactly alike since there may be slight variations in the material from which they are made and dimensions may vary slightly so that in order to use such springs for the purpose above described it is necessary to provide for adjustments to compensate for such variations. The adjusting screw 27 provides for adjustment according to the free height of the particular spring 25 used in the device in connection with initially locating the seat for the release valve 47 with respect to said valve. The screw 72 provides for adjusting the gauge hand 76 to its "mean" pressure position dependent upon the free height of spring 25 and therefore its height when the fluid pressure regulating device is delivering fluid at "mean" pressure to pipe 33, and the screw 80 provides for adjustment of the gauge hand 76 in accordance with the "pick up" or change in height of the spring for a given change in load or pressure in pipe 33. Since the "pick up" of a particular spring 25 is substantially constant throughout full compression or extension it will therefore be seen that if the gauge hand 76 is accurately adjusted for 80 pounds as above described, it will, with an equal degree of accuracy on the scale 79 indicate pressures in pipe 33 either side of the "mean" pressure, so that only the one adjustment following the "mean" adjustment is necessary.

It has been found that the diaphragm 14 will very accurately, and consistently over a long period of use, assume positions corresponding to different pressures of fluid delivered to pipe 33 and that change in position of said diaphragm is directly proportional to change in delivered pressure. The vertical position of push rod 71 will hence vary directly according to the position of diaphragm 14 and pressure delivered to pipe 33 but the angular movement of lever 73 and hence gauge hand 76 will become increasingly less for equal steps of movement of said push rod 71 as the axis of screw 80 moves in either direction further away from the axis of screw 77. The graduation of scale 79 could be unequally spaced to accurately indicate correct pressures according to this change in angularity of the lever 73, but it is preferred that such graduations be equally spaced so movement on lever 73 and hand 76 is therefore limited to a relatively small degree either side of the position where the axis of screw 80 intersects that of pin 77 in order to minimize the effect of change in angularity of lever 73 and permit equal spacing of the graduations of scale 79 and which for all practical purposes will indicate with the desired degree of accuracy pressure present in pipe 33.

After the device including the gauge hand 76 has been adjusted as above described such adjustment will remain for an indefinite period of time and the device is ready for use.

In use, the pipe 9 will be connected to a shop line, the pipe 33 will be connected to the device which it is desired to operate by fluid under pressure, such for example as the piston of a fluid pressure actuated clutch which may be employed for gripping and carrying an article to be worked on, and pipe 12 may be connected to the device or the opening for said pipe in said device may be plugged, as desired.

The handle 67 of the cut-off valve device may now be operated to its on position for supplying fluid under pressure to chamber 36 in plunger 29 and the hand wheel 52 will then be adjusted as before described, to provide in pipe 33 the desired pressure, indicated by the gauge hand 76, for operating the clutch piston. After the fluid pressure regulating device 15 is thus adjusted handle 67 of the cut-off valve device may be operated to its off position to permit closing of supply valve 53 and unseating of plunger 60 from said valve for releasing fluid under pressure from chamber 36 in plunger 29, whereupon fluid under pressure in pipe 33 and delivery chamber 30 will at first blow the supply valve 43 from its seat to permit release of fluid under pressure therefrom to chamber 36 and thence to atmosphere via plunger 60. When a slight reduction in pressure in chamber 18 is thus obtained regulating spring 25 will expand and hold the supply valve 43 open to permit a complete release of fluid under pressure from pipe 33 and the clutch operating piston.

With the pressure regulating valve device 15 once adjusted, as just described, to provide the proper pressure for operating the clutch piston, the operation of the handle 67 of the cut-off valve device to its on and off positions will control operation of the clutch as desired to grip and release articles as required during manufacture thereof.

It is desired to point out that when the handle 67 is turned to its on position for supplying fluid under pressure to operate the clutch piston a slight overcharging of pipe 33 may tend to occur but this is of no consequence since this higher than desired pressure acting chamber 18 on diaphragm 14 will promptly deflect said diaphragm to a degree for unseating the release valve 47 to dissipate such excess pressure whereupon said diaphragm will be promptly operated by spring 25 to close the release valve 47 and hold the desired pressure, indicated by gauge hand 76, in the pipe 33 and on the clutch piston.

If there should be leakage of fluid under pressure past the supply valve 43 to pipe 33, the tendency to increase the pressure in said pipe will cause the diaphragm 14 to unseat the release valve just sufficient to offset such leakage. Conversely, if the release valve 47 should leak tending to reduce the pressure in pipe 33 the effect on diaphragm 14 will permit spring 25 to unseat the supply valve 43 just sufficient to offset such leakage. In other words, the regulating device 15 will under all conditions provide and maintain in pipe 33 fluid at the desired pressure as constantly indicated by the gauge hand 76.

*Summary*

It will now be seen that I have provided an improved relatively simple device for providing clean fluid at any desired pressure for operating a selected device and for releasing such fluid under pressure and for dependably indicating such pressure for an indefinite period of time.

Having now described the invention, what I claim as new and desire to secure by Letters Patent, is:

1. A fluid pressure regulating valve and pressure indicating device comprising, in combination, an axially adjustable plunger, hand operated means for adjusting said plunger, a pressure regulating spring, movable abutment means arranged in coaxial relation to said plunger and subject to opposing pressures of fluid in a chamber, formed between an adjacent end and face of said plunger and movable abutment means, respectively, and of said spring which spring urges said abutment means toward said plunger, and valve means controlled by relative movement between said plunger and abutment to provide fluid in said chamber at a pressure corresponding to adjustment of said plunger for correspondingly positioning said abutment means against said spring, a rod projecting from said abutment means and movable therewith, a lever straddling the end of said rod opposite said abutment means, an adjusting screw in said lever intermediate the ends thereof engaging said end of said rod, means providing a fixed fulcrum for one end of said lever, a pivoted pressure indicating gauge hand, an adjusting screw in the other end of said lever connected to said hand and adjustable to vary the effective length of said lever for operating said hand, the parts being so constructed and arranged that in one pressure indicating position of said hand an extension of the axis of the last named screw will intersect the axis of the pivot for said hand.

2. A fluid pressure regulating valve and pressure indicating device comprising a casing having a supply chamber adapted to be connected to a source of fluid under pressure and having a fluid pressure delivery chamber, a supply valve for supplying fluid under pressure from said supply chamber to said delivery chamber, a release valve for releasing fluid under pressure from said delivery chamber, a seat for said supply valve, a movable abutment subject on one side to pressure of fluid in said delivery chamber, a regulating spring acting at one end on the opposite side of said abutment operative upon a preponderance in force over opposing force of pressure of fluid in said delivery chamber to effect seating of said release valve and unseating of said supply valve, upon equalization of opposing forces on said abutment to effect seating of both said release and supply valves, and upon reversal of said preponderance in force to effect unseating of said release valve, a plunger mounted in said casing supporting said supply valve seat and manually adjustable to adjust said seat relative to said abutment axially thereof, a spring seat engaged by the opposite end of said regulating spring, an adjusting member screw-threaded in said casing engaging and operative to adjust said spring seat relative to said spring axially thereof, a rod projecting from said abutment means and movable therewith, a lever straddling the end of said rod opposite said abutment means, an adjusting screw in said lever intermediate the ends thereof engaging said end of said rod, means providing a fixed fulcrum for one end of said lever, a pivoted pressure indicating gauge hand, an adjusting screw in the other end of said lever connected to said hand and adjustable to vary the effective length of said lever for operating said hand, the parts being so constructed and arranged that in one pressure indicating position of said hand an extension of the axis of the last named screw will intersect the axis of the pivot for said hand.

References Cited in the file of this patent

UNITED STATES PATENTS

| | | |
|---|---|---|
| 146,716 | Schmidt | Jan. 20, 1874 |
| 190,790 | Snyder | May 15, 1877 |
| 750,752 | Cole | Jan. 26, 1904 |
| 769,482 | Kleinfeldt | Sept. 6, 1904 |
| 1,598,361 | Becker | Aug. 31, 1926 |
| 2,089,144 | Work | Aug. 3, 1937 |
| 2,313,564 | Manly | Mar. 9, 1943 |
| 2,347,321 | Huber | Apr. 25, 1944 |
| 2,358,644 | Kelley | Sept. 19, 1944 |
| 2,360,178 | Turpin et al. | Oct. 10, 1944 |

FOREIGN PATENTS

| | | |
|---|---|---|
| 156,543 | Germany | 1935 |